US005467443A

United States Patent [19]

Johnson et al.

[11] Patent Number: 5,467,443
[45] Date of Patent: Nov. 14, 1995

[54] SYSTEM AND METHOD FOR AUTOMATICALLY GENERATING DERIVED GRAPHIC ELEMENTS

[75] Inventors: Steven R. Johnson; Kevin F. Crowder; Samantha Seals-Mason; James R. Von Ehr, II, all of Plano, Tex.

[73] Assignee: Macromedia, Inc., San Francisco, Calif.

[21] Appl. No.: 765,370

[22] Filed: Sep. 25, 1991

[51] Int. Cl.[6] .................................................. G06T 11/00
[52] U.S. Cl. ................ 395/141; 395/142; 395/133; 395/138
[58] Field of Search ................... 395/119, 120, 395/125, 128, 129, 141–143, 155, 156, 163, 133, 138; 340/723–725, 728; 382/44; 345/121, 122

[56] References Cited

U.S. PATENT DOCUMENTS

| | | | |
|---|---|---|---|
| 4,384,338 | 5/1983 | Bennett | 395/163 |
| 4,785,399 | 11/1988 | Evans et al. | 395/156 |
| 5,025,394 | 6/1991 | Parke | 340/728 X |
| 5,048,102 | 9/1991 | Tararine et al. | 382/44 X |
| 5,053,760 | 10/1991 | Frasier et al. | 340/728 X |
| 5,175,808 | 12/1992 | Sayre | 382/44 X |

OTHER PUBLICATIONS

Declaration of Experimental Use (Attached as Exhibit "A").
Aldus Freehand 2.0, 1988. (Exhibit "B") Table of Contents and pp. 5.20–5.23.
Aldus Freehand 3.0, 1991. (Exhibit "B") Table of Contents and pp. 154–163, Chapter 5.

*Primary Examiner*—Almis R. Jankus
*Attorney, Agent, or Firm*—Fulbright & Jaworski

[57] ABSTRACT

A system and method in which derived graphic elements are generated automatically upon changes made to the defining graphic elements or generation parameters. A user need only modify the defining element(s) and the system will eliminate any originally derived elements and substitute therefor any newly created derived elements. The system is arranged to inhibit the generation of the derived elements until all of the changes associated with all of the defining element(s) have been made. The regeneration of the derived elements is performed once even if multiple defining elements have been modified.

47 Claims, 5 Drawing Sheets

SYSTEM AND METHOD FOR AUTOMATICALLY GENERATING DERIVED GRAPHIC ELEMENTS

TECHNICAL FIELD OF THE INVENTION

This invention relates to a graphics system and more specifically to a system and method for blending shapes, colors and other graphical attributes between various paths.

BACKGROUND OF THE INVENTION

There exist graphics presentation systems which have the capability of blending colors to arbitrary shades between two end-point colors and for creating intermediate shapes between two end shapes. This has several useful purposes, one of which, for example, is that graphic artists can use the systems to make a smooth graduation between two colors or shapes for highlights or shading or for whatever purpose they might have in mind. The drawback to most of these packages is their inflexibility.

In order to create a blend between two shapes, (or a graduation in color) a user must pick the two end shapes that are wanted, select the derived number of intermediate steps between the two end shapes and then the program would generate the intermediate shapes. In the prior art, however, to make a change, the user had to go back and manually purge the intermediate shapes, then make the changes that are desired and then manually call for the intermediate shapes to be regenerated. Thus, experimental changes to the intermediate shapes (or colors, or other attributes such as line width or angle of a graduated fill) are cumbersome and inconvenient, especially if a user desires to make several experimental changes.

Systems that perform this type of shading and blending are, for example, Aldus Freehand 2.0, which was released to the public in 1988. That program allowed a user to draw two shapes and then designate a number of computer-generated intermediate shapes between them. However, if the user later decided that he/she is not satisfied with the intermediate shapes because the color (or shape) of one of the source shapes was not what was wanted, the user would have to pick out all of the intermediate shapes, manually remove them, alter one or both of the source shapes (or their color), go back and select the two source shapes, and then respecify how many intermediate steps he/she wanted to use to blend the source colors and shapes. This same cumbersome process is required for any change that the user might want to make to one of the source paths. For instance, each time the user wanted to change the shape or color of one or both of the source paths, or wanted to change the number of intermediate steps generated to effect a smooth blending of shapes, the user must repeat the same cumbersome process.

Thus, a need exists in the art for a system in which a user need not manually remove all of the intermediate images when it is desired to change the blending (or shapes) between the two end shapes.

A further need exists in the art for a graphic presentation system which allows a user to simply change one or more of the end shapes (or colors) and then automatically readjust all of the computer-generated shapes (or colors) without user involvement and without requiring the user to first remove the original computer-generated shapes (or colors).

SUMMARY OF THE INVENTION

These problems have been solved by a system arrangement which allows one or more of the defining element(s) (source paths) of a blend construct to be modified and the derived elements to be discarded and recreated automatically once the modified defining element(s) are entered into the system. We have streamlined the process so that when the user first creates a blend construct, there is maintained an internal reference between all of the derived elements and the specified defining element(s). Thus, the user can go back into the system and change the shape, color, line size or other attributes of one or more of the defining element(s) or the user can respecify the number of intermediate steps. After each user entered change, the system will discard the old derived elements and generate a new series of derived elements. Using this system, the time necessary to make experimental changes is greatly reduced, allowing the user to be more efficient and creative.

In addition to maintaining a list of derived elements, the system is designed so that changes can be made concurrently to any number of the defining element(s). When defining element(s) are altered, the system will regenerate the derived elements one time, as opposed to regenerating once for every defining element that was modified. An example of this situation is as follows:

If a user desires to change the shape, color or other graphical attributes of multiple defining elements at the same time, the system will generate the minimal number of reblends. So rather than discarding and regenerating derived elements after each defining element changes, the system does it once, incorporating the changes made to any of the defining elements.

For our purposes, a shape is a mathematical representation of a geometric construct, which can be open or closed, and which is composed of curves or straight lines. An element is a shape together with its graphical attributes, such as color, line width, fill properties and line properties. A blend construct consists of defining elements and derived elements and other information such as the number of steps used to calculate the derived elements. A defining element is an element that can be used to calculate the essential information required to construct other elements. A derived element is an element which is calculated from the defining element(s) via a preset mathematical relationship. The phrase derived elements can refer to one or more derived elements.

There are two main structures used to maintain a dynamic link between the defining element(s) and derived elements. One is known as a "blend construct." Whenever the user requests a blending of defining element(s), a blend construct is created. The blend construct contains an internal reference to the defining element(s), the number of derived elements in the blend, and other internal information necessary to calculate the derived elements. In addition, each defining element is given an internal reference to the blend construct.

The other structure is a "cleanup list." A cleanup list is a list of all blend constructs which need to regenerate their derived elements.

Whenever a defining element is edited by the user, the defining element notifies each of its blend constructs that it has changed. Each blend construct then adds itself to the cleanup list. After all changes have been entered, a message is sent to all blend constructs in the cleanup list. In response to this message, the effected components of the blend constructs are discarded and the system regenerates a new series of derived elements.

The cleanup list avoids redundant regeneration if a user modifies multiple defining elements in the same operation. Regeneration can be a time-consuming operation and is efficiently minimalized by this system. Although the system could regenerate derived elements immediately after a defining element is changed, doing so would cause multiple regenerations when only one is necessary (i.e., each modified defining element informs the blend construct it was changed). The cleanup list system merely inserts all effected blend constructs into the list when it receives a "defining element changed" message. A blend construct is given only one entry into the cleanup list, regardless of how many times it receives a "defining element changed" message.

Accordingly, it is one technical advantage of our invention that a graphics system can operate to regenerate multiple derived elements between multiple defining elements upon a change to one or more of those defining elements.

A further technical advantage of our invention is that the derived elements associated with a blend construct are stored in conjunction with that blend construct such that when changes are made to the defining elements, or to the blend parameters, the originally created derived elements are automatically changed to the new derived elements.

A still further technical advantage of our invention is that the derived elements between multiple defining elements in a graphics system are stored in an object file for later creating the derived elements after all changes have been made to all pertinent defining elements or blend parameters pertaining to the new derived elements.

It is a still further technical advantage of our invention that the derived elements in a blend construct will not be created until all of the changes desired to be made to that blend construct have been specified by a system user.

It is a still further technical advantage that our invention uses the saved derived elements to draw and print thereby saving calculation overhead during those drawing or printing operations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Before beginning a discussion of the operation of our system, it might be helpful if a series of steps were illustrated using the prior art graphics editing system.

Figure 1:
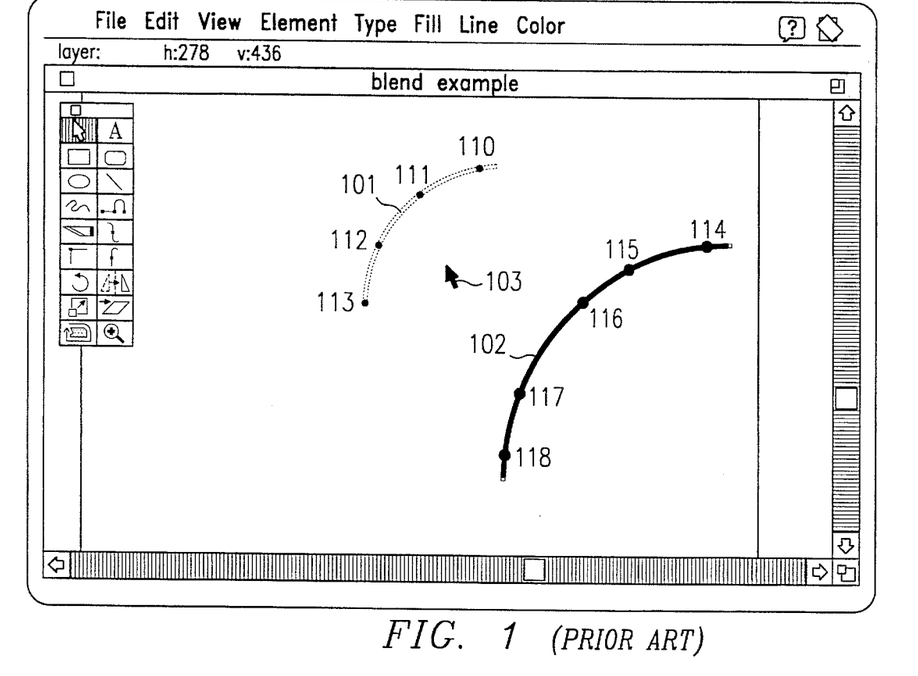
FIG. 1 shows a prior art graphics system.

FIG. 1 shows the prior art system which can be the Aldus FreeHand 2.0 system discussed above. Two defining elements, 101 and 102, are drawn, ready to be blended. Defining element 101 contains shape defining points 110–113, while defining element 102 contains shape defining points 114–118. The user selects the "Blend" command box 201 (FIG. 2) from a menu using cursor arrow 103.

Figure 2:
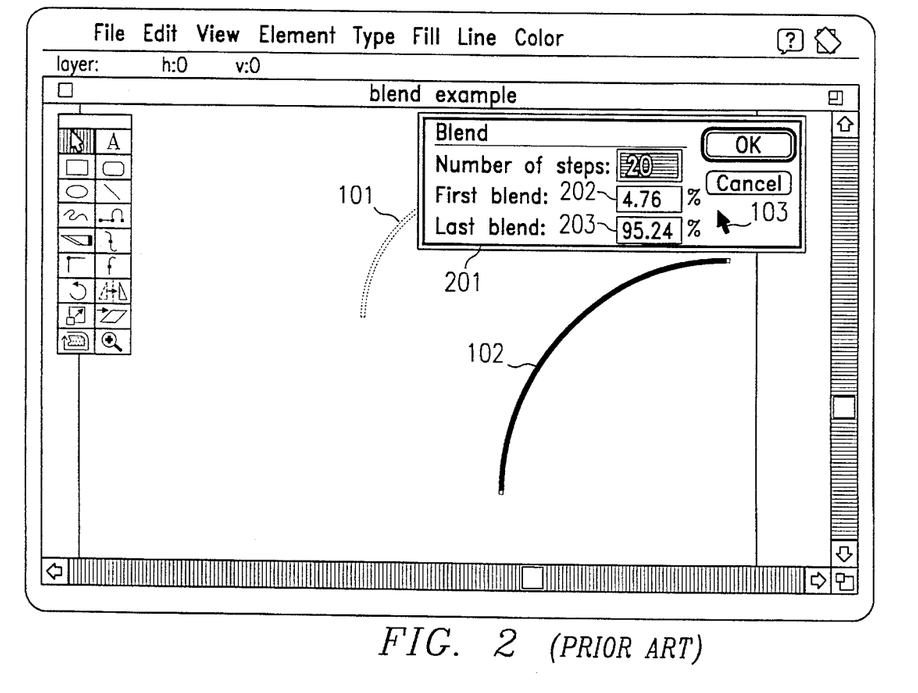
FIG. 2 illustrates the user about to create a blend in the prior art system.

FIG. 2 illustrates the user about to create a blend in the prior art system. The user has specified the number of intermediate steps derived (20 in this case), and clicks "OK" to create the blend. Note that the "First Blend" box 202, and last blend box 203 control the attributes and position of the blend between defining elements 101 and 102. Note that if "first blend" is negative or if "last blend" is more than 100 percent, then the derived elements would be extrapolated outward from the defining elements.

Figure 3:
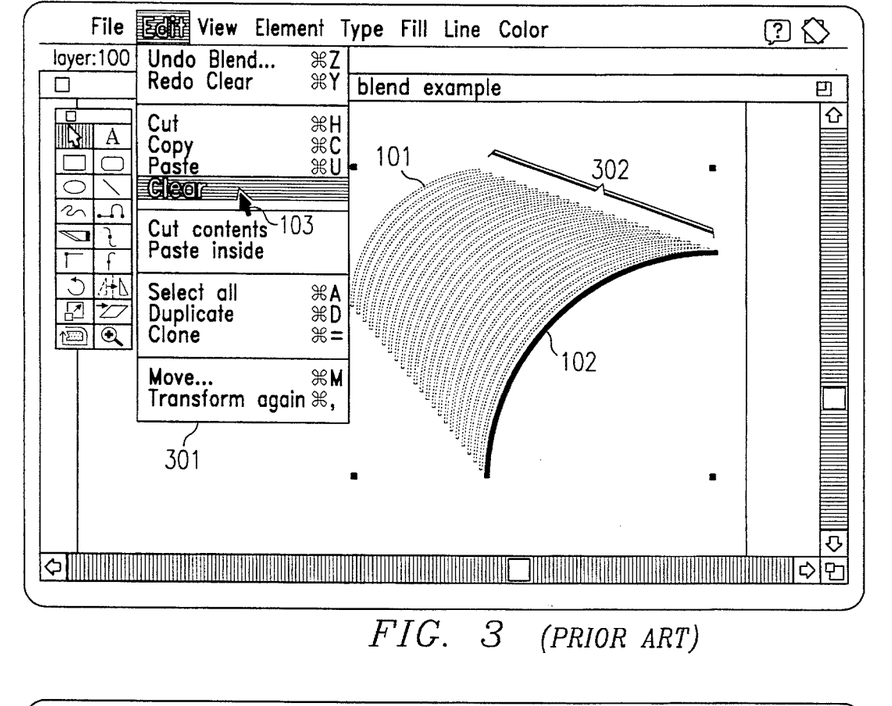
FIG. 3 shows the blend created by the user in the prior art and preparation for removal of the derived elements.

FIG. 3 shows blend 302 created by FIGS. 1 and 2 and the user is about to remove the derived elements using menu 301. If the user decides the shape of one of the defining elements (such as element 101) is not quite right, or perhaps the blend is not quite the color blend desired, the user then must first change the shape of element 101 and then also must regenerate the blend after changing the shape (or color) of that element. To do so, the user must first delete the derived elements by selecting them with cursor 103 and then choosing "Clear" from menu 301.

Figure 4:
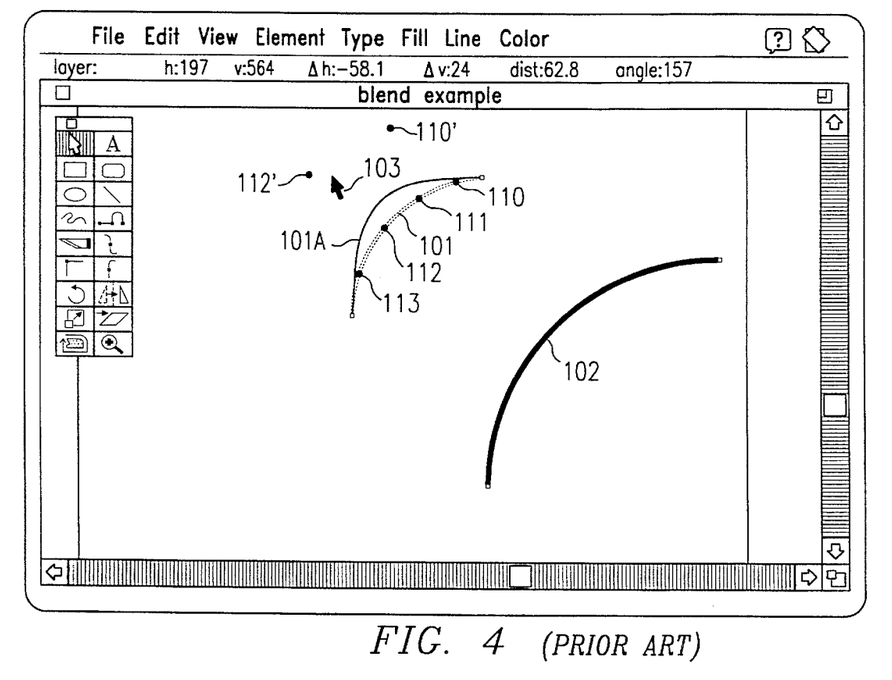
FIG. 4 shows the user modifying a defining element in the prior art system.

FIG. 4 shows the user, via cursor 103, actually reshaping defining element 101 to the new shape derived by dragging two of the elements' control points 110' and 112' via cursor 301. This generates revised defining element 101A. The user may also change any attribute of the defining element in a similar manner.

Figure 5:
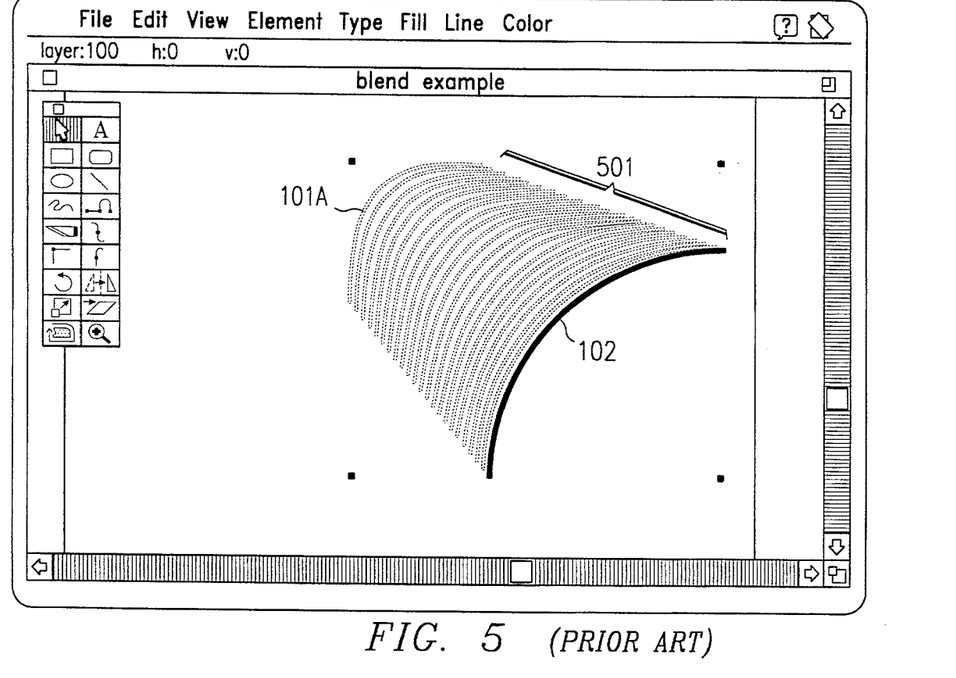
FIG. 5 shows the result of the user creating a new set of derived elements in the prior art.

FIG. 5 shows the new derived elements. This was created by the user after the user had adjusted the defining elements to his/her satisfaction and was manually using the same steps as shown in FIGS. 1 and 2.

Figure 6:
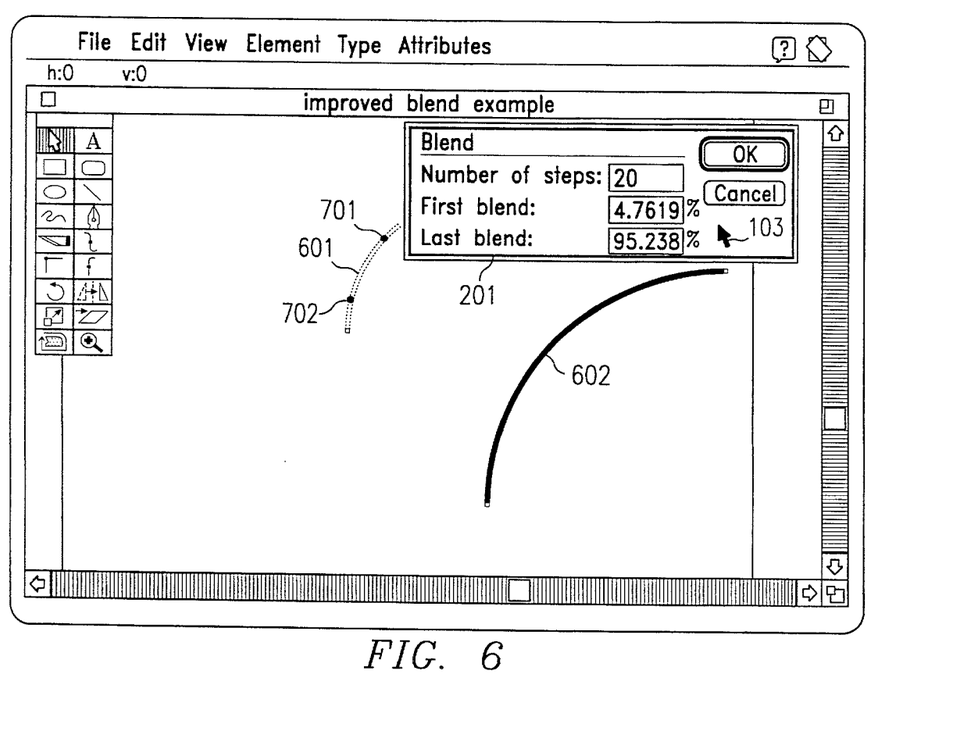
FIG. 6 illustrates creation of the blend construct in the present invention.
Figure 7:
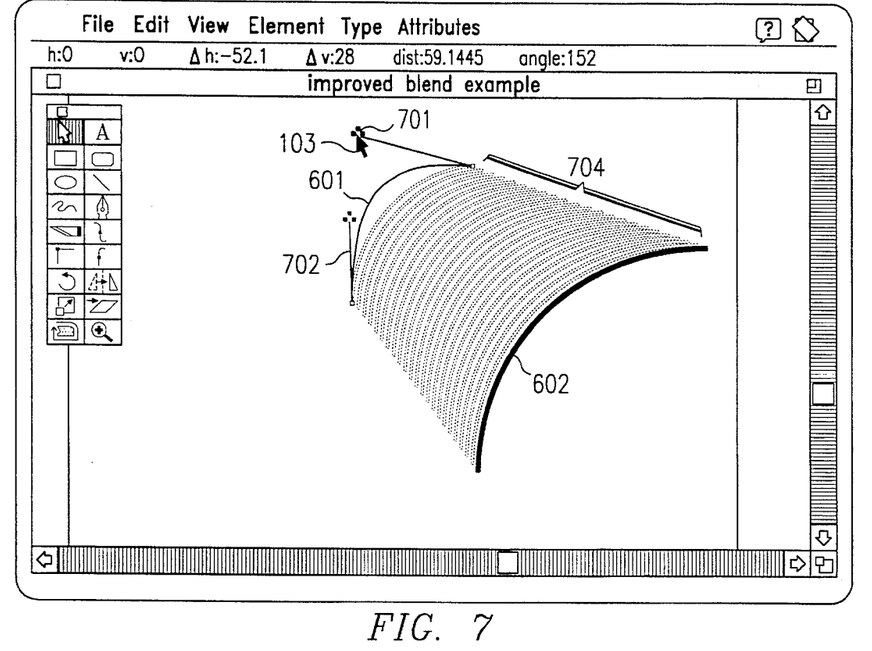
FIGS. 7 and 8 illustrate the automatic reblending of derived elements in the present invention.
Figure 8:
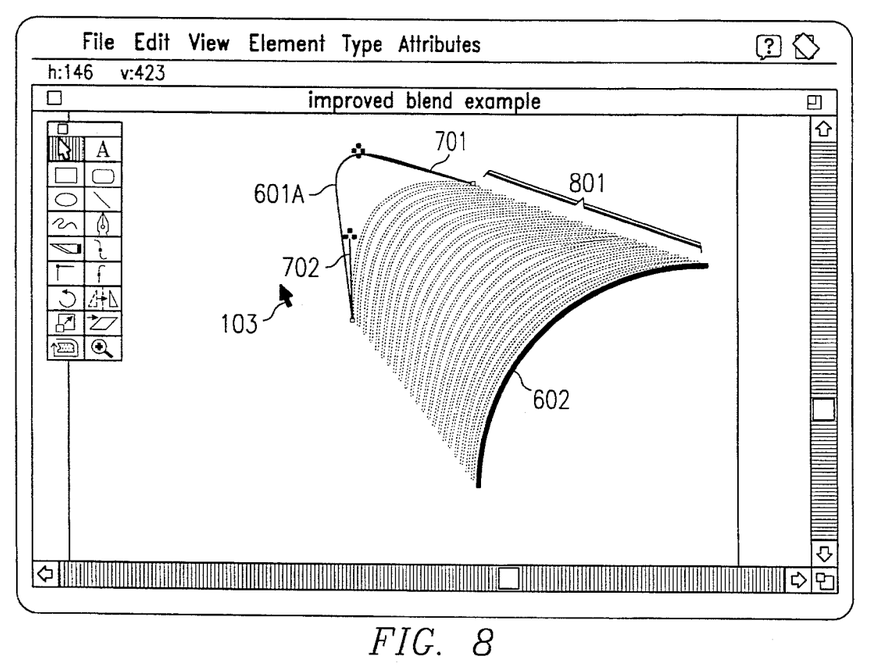

FIGS. 6, 7 and 8 illustrate the automatic reblending of derived elements in accordance with our invention.

FIG. 6 shows the user creating a blend construct. This blend has defining elements 601 and 602. The steps for creating it (as opposed to editing it) are much the same as the prior art and shown in FIGS. 1 and 2.

FIG. 7 shows the blend construct created in FIG. 6 and the user modifying one of the defining elements.

If the user is dissatisfied with the shape, color, etc. of one (or both) defining elements 601 or 602, he/she can simply select the defining element(s) and make the changes directly as shown in FIG. 7. In this situation control points 701 and 702 are moved as shown. The intermediate shapes (or colors) 801 will be regenerated automatically as shown in FIG. 8.

In FIG. 7, the user reshaped defining element 601. It is important to note that he/she did not have to manually delete the derived elements 704, nor did the user have to return to command box 201 (FIG. 2) to create a new blend; the relationship between the defining elements (which can be two or more) is remembered and used to calculate the new derived elements 801. The user did not have to do anything special to cause this to happen. In the prior art, the user had to take several steps after reshaping a defining element in order to bring the derived elements up to date. Those steps were: 1) select and delete the original derived elements; 2) reselect the modified defining elements; and 3) reselect the blend command and respecify the information in command box 201 (FIG. 2).

This system and method just discussed is currently operated on the Macintosh line of computers made by Apple Computer running the 6.0 or later version of their system software. The specifications of the Macintosh with version 6.0 operating system are hereby incorporated by reference. Also incorporated by reference is the Aldus Freehand system 2.0 and the Aldus Freehand system 3.0 which are all available from distributors. This setup requires two or more megabytes of RAM and a hard drive. This example is used as an illustration only and it should be understood that this system can run on any type of hardware that is capable of supporting graphics software. Typically, any system with high resolution graphics can be used. Although high resolution graphics capability is not essential for the application of the described invention, it is important if the user needs to visualize the work product.

In the prior art system, as discussed above, there are two defining elements. A user selects these two defining elements and specifies the number of steps desired as intermediate steps between the two. The resulting derived elements are treated by the system similarly to the defined elements themselves.

In the advanced system, also as discussed above, whenever a user requests a blending of defining elements, a blend construct is created with an internal reference to those defining elements. The blend construct also contains the blend parameters which is the reference to the number of requested intermediate steps, as well as a reference to each derived element generated.

The new system and method maintains the derived elements internally and the user cannot access them without breaking the dynamic structure of the blend construct. Whenever a defining element is changed, the system discards the derived elements generated previously, and regenerates new ones based on the new structure of the defining elements.

The major problem encountered is in maintaining a communications link between the parts comprising a blend construct. For instance, how does the blend construct find out when the defining elements are changed, etc.? When the blend construct is created, the defining elements are given an internal reference to the blend construct as well as the blend construct being given a reference to the defining elements. Anytime a defining element is changed, for example, if the shape or color is changed, the defining element notifies the appropriate blend construct. Once the blend construct receives a message that one of its defining elements has changed, it is configured to regenerate itself later. As an aid to efficiency, the blend construct does not reblend immediately but adds itself into a cleanup list. After all of the desired changes have been entered, everything in the cleanup list is reblended at one time rather than reblending after each change.

Figure 9:
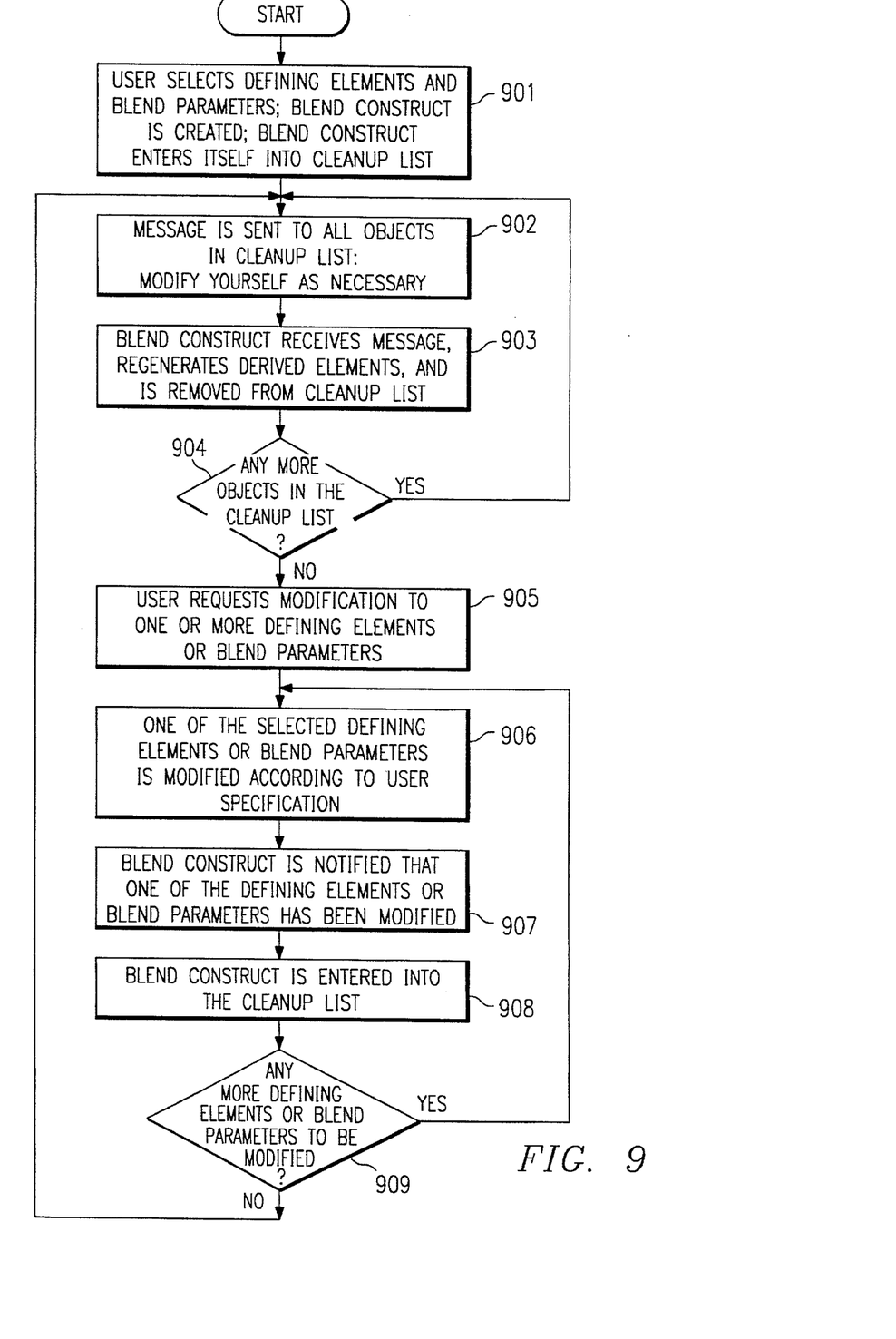
FIG. 9 is a flow chart showing the recalculation of derived elements in the present invention.

The algorithm described in FIG. 9 not only ensures that all derived elements are always regenerated when necessary, but also that they are never regenerated more times than minimally necessary.

In box 901, the user specifies the blend construct for the first time. The user then specifies the defining elements and the blend parameters. The blend construct is created, and is entered into the cleanup list.

In boxes 902, 903 and 904, the items in the cleanup list will be given the opportunity to regenerate their derived elements, if necessary. Each item in the cleanup list is told to make necessary modifications to itself. The blend construct responds to this by regenerating its derived elements (as calculated from the defining elements and the blend information). Note that "regenerating" means to automatically recalculate the new derived elements, and discard the old derived elements. After completing the regeneration, the blend construct is removed from the cleanup list. As will be seen below, there could be multiple blend constructs in the cleanup list if the user has simultaneously modified the defining elements or blend parameters in multiple blend constructs.

In box 905, the user has requested a modification to one or more defining elements or blend parameters. For example, this could be a change in the shape, color, graphical attribute, etc. of the defining element, or in the number of derived elements, etc. in the blend parameters. Also note that it is allowable for the user to simultaneously specify a change to multiple defining elements or blend parameters, in multiple blend constructs (for example, to change the color of several defining elements at the same time).

In boxes 906 through 909, the defining elements or blend parameters are modified in accordance with the user request, and the appropriate blend constructs are notified of the changes. In box 906, a single defining element or blend parameter is modified as specified by the user. In box 907, the blend construct associated with that defining element or blend parameter is notified that one of its defining elements or blend parameters has been changed. In box 908, the blend construct is entered into the cleanup list.

After all the defining elements and blend parameters specified in this operation have been modified, and all blend constructs associated with them have been entered in the cleanup list, execution jumps back to box 902, where all blend constructs in the cleanup list are told to regenerate their derived elements.

Note that while the system is shown as a graphical system for displaying shapes on a screen, the invention could be used for many other systems. For example, it could be an image of an internal organ of an animal with the defined elements being those which may not be "seen" by an image scanner, but rather derived from the defining elements, i.e., the outline of the organ.

Although the present invention and its advantages have been described in detail, it should be understood that various changes, substitutions and alterations can be made herein without departing from the spirit and scope of the invention as defined by the appended claims.

What is claimed is:

1. A graphics system for establishing as a plurality of pixels on a graphics display screen a plurality of derived elements derived from at least one defining element represented as a plurality of pixels on said display screen, said system comprising:

means for specifying a shape of said at least one defining element;

means for accepting and storing a set of parameters pertaining to a desired generation of said derived elements from said at least one defining element;

means controlled by said stored set of parameters for generating said derived elements from said at least one defining element;

means operational while said derived elements remain derived from said at least one defining element for regenerating new derived elements in accordance with updated parameters, said regenerating means being enabled by a change to said at least one defining element; and means for changing at least one of said at least one defining element.

2. The system set forth in claim 1 wherein said derived elements are positionally related to at least two defining elements.

3. The system set forth in claim 2 wherein said defining elements are any of a plurality of shapes.

4. The system set forth in claim 3 wherein said shapes have variable line widths and colors.

5. The system set forth in claim 2 wherein said parameters control color blending between a color associated with each said defining element.

6. The system as set forth in claim 1 further including:

means for controlling said regenerating means to be responsive to changes in any of said defining elements.

7. The system set forth in claim 6 wherein said changes include changes to colors of said defining elements.

8. The system set forth in claim 6 wherein said changes include changes to the shapes of said defining elements.

9. The system set forth in claim 6 wherein said changes include changes to line widths of said defining elements.

10. The system set forth in claim 6 wherein said changes include changes to fill attributes of said defining elements.

11. The system set forth in claim 6 wherein said changes include changes to the line attributes of said defining elements.

12. A graphics system for establishing a plurality of derived elements for display on a display screen as a plurality of pixels and derived from at least one defining element represented on said display screen as a plurality of pixels, said system comprising:

means for specifying a shape of said at least one defining element;

means for accepting and storing a set of parameters pertaining to a desired generation of said derived elements from said at least one defining element;

means controlled by said stored set of parameters for generating said derived elements;

means operational while said derived elements remain derived from said at least one defining element for regenerating new derived elements in accordance with updated parameters; and means for changing said stored parameters and wherein said regenerating means is enabled by said change to said parameters.

13. A graphics system for establishing on a display screen a plurality of derived elements represented as a plurality of pixels and derived from at least one defining element represented on said display as a plurality of pixels, said system comprising:

means for specifying a shape of said at least one defining element;

means for accepting and storing a set of parameters pertaining to a desired generation of said derived elements from said at least one defining element;

means controlled by said stored set of parameters for generating said derived elements; and means operational while said derived elements remain derived from said at least one defining element for regenerating new derived elements in accordance with updated parameters, wherein said parameters control a number of said derived elements.

14. A system for establishing as a plurality of pixels on a display screen a plurality of derived elements derived from defining elements represented as a plurality of pixels on said screen, said system comprising:

means for displaying on said display screen shapes of each said defining elements;

means for accepting and storing a set of parameters pertaining to a desired generation of said derived elements from said defining elements;

means controlled by said stored set of parameters for displaying said derived elements;

means for modifying a display of said derived elements in accordance with updating of certain of said parameters without respecifying all of said parameters, said modifying means being enabled by said change to said defining elements; and means for changing at least one of said defining elements.

15. A system for establishing for display as a plurality of pixels on a display screen a plurality of derived elements derived from a plurality of defining elements represented as a plurality of pixels on said screen, said system comprising:

means for displaying on said display screens shapes of each said defining elements;

means for accepting and storing a set of parameters pertaining to a desired generation of said derived elements from said defining elements;

means controlled by said stored set of parameters for displaying said derived elements;

means for modifying a display of said derived elements in accordance with updating of certain of said parameters without respecifying all of said parameters; and means for controlling said modifying means to be responsive to changes in any of said defining elements.

16. The system set forth in claim 15 wherein said changes include changes to colors associated with said defining elements.

17. The system set forth in claim 15 wherein said changes include changes to the shapes of said defining elements.

18. The system set forth in claim 15 wherein said changes include changes to line widths of said defining element.

19. The system set forth in claim 15 wherein said changes include changes to fill attributes of said defining elements.

20. The system set forth in claim 15 wherein said changes include changes to line attributes of said defining elements.

21. A system for establishing as a plurality of pixels on a display screen a plurality of derived elements derived from a plurality of defining elements representing as a plurality of pixels on said screen, said system comprising:

means for displaying on said display screen shapes of each said defining elements;

means for accepting and storing a set of parameters pertaining to a desired generation of said derived elements from said defining elements;

means controlled by said stored set of parameters for displaying said derived elements;

means for modifying a display of said derived elements in accordance with updating of certain of said parameters without respecifying all of said parameters; and means for changing said stored parameters and wherein said modifying means is enabled by said change to said parameters.

22. A system for establishing a plurality of derived elements on a display screen as a plurality of pixels derived from defining elements represented on said screen as a plurality of pixels, said system comprising:

means for displaying shapes of each said defining elements;

means for accepting and storing a set of parameters pertaining to a desired generation of said derived elements from said defining elements;

means controlled by said stored set of parameters for displaying said derived elements; and means for modifying a display of said derived elements in accordance with updating of certain of said parameters without respecifying all of said parameters, wherein said parameters control a number of said derived elements derived from said defining elements.

23. A system for establishing on display screen as a plurality of pixels a plurality of derived elements derived from defining elements represented on said screen as a plurality of pixels, said system comprising:

means for displaying shapes of each said defining elements;

means for accepting and storing a set of parameters pertaining to a desired generation of said derived elements from said defining elements;

means controlled by said stored set of parameters for displaying said derived elements; and means for modifying a display of said derived elements in accordance with updating of certain of said parameters without respecifying all of said parameters, wherein said defining elements are any one of a plurality of shapes.

24. The system set forth in claim 23 wherein said shapes have variable line widths and colors.

25. A method of displaying derived elements as a plurality of pixels derived from at least one defining element displayed as a plurality of pixels wherein said derived elements are generated in accordance with a set of provided parameters and said at least one defining element, said method comprising the steps of:

accepting at least one new parameter while said derived elements are still displayed;

modifying a characteristic of said display of said derived elements in accordance with said accepted at least one new parameter without respecification of all said parameters, said characteristic selected from a group consisting of display shape and display color of said derived elements; and monitoring said at least one defining element for changes thereto.

26. The method set forth in claim 25 wherein said derived elements are derived from at least two defining elements and wherein said display shape of each of said derived elements is defined as an intermediate shape between a pair of defining elements.

27. The method set forth in claim 26 wherein said derived shapes have variable line widths and colors.

28. The method set forth in claim 25 wherein said at least one parameters control color blending derived from said defining element.

29. The method set forth in claim 25 wherein said derived elements are derived from at least two defining elements and wherein said display shape of each of said derived elements is defined as an intermediate shape between each successive pair of said defining elements taken in sequence.

30. The method set forth in claim 25 wherein said derived elements are derived from at least two defining elements and wherein said display color of each of said derived elements is defined as an intermediate color between a pair of defining elements.

31. The method set forth in claim 25 wherein said derived elements are derived from at least two defining elements and wherein said display color of each of said derived elements is defined as an intermediate color between each successive pair of defining elements taken in sequence.

32. A system for blending shapes and colors with respect to at least one defining element represented by a plurality of display pixels, said system comprising:

means for determining a select number of derived elements for display as a plurality of pixels to be derived from said at least one defining element;

means for storing information to identify ones of said derived elements with respect to said at least one defining element; and means for regenerating said derived elements whenever said at least one defining element have been modified.

33. A system for blending shapes and colors of at least one derived element to be displayed as a plurality of pixels with respect to at least one defining element displayed as a plurality of pixels, said system comprising:

means for generating a number of said at least one derived element to be derived from said at least one defining element;

means for storing information to identify said at least one derived element with respect to said at least one defining element; and means for utilizing said stored information to purge all derived elements derived from said at least one defining element that has been modified.

34. A system for blending shapes and colors of at least one derived element to be displayed as a plurality of pixels with respect to at least one defining element displayed on a plurality of pixels, said system comprising:

means for determining a selected number of said at least one derived element to be derived from said at least one defining element;

means for storing information to identify said at least one derived element with respect to said at least one defining element; and means controlled by said stored information for regenerating said at least one derived element after one or more of said defining elements have been modified without explicit invocation of said regenerating means.

35. A system for blending shapes and colors of at least one derived element to be displayed as a plurality of pixels with respect to at least one defining element displayed as a plurality of pixels, said system comprising:

means for determining a selected number of said at least one derived element to be derived from said at least one defining element;

means for storing information to identify said at least one derived element with respect to said at least one defining element; and means controlled by said stored information for regenerating said at least one derived element after at least one of said parameters have been modified without explicit invocation of said regenerating means.

36. A system for blending shapes and colors of at least one derived element to be displayed as a plurality of pixels with respect to at least one defining element displayed as a plurality of pixels, said system comprising:

means for determining a number of said at least one derived element to be derived from said at least one defining element;

means for storing information to identify said at least one derived element with respect to said at least one defining element; and means for utilizing said stored information to discard all derived elements associated with a modified defining element and for regenerating at least one new derived element in one operation.

37. A system for blending shapes and colors of at least one derived element to be displayed as a plurality of pixels with respect to at least one defining element displayed as a plurality of pixels, said system comprising:

means for determining a selected number of said at least one derived element to be derived from said at least one defining element;

means for storing information to identify said at least one derived element with respect to said at least one defining element, wherein said at least one derived element derives from at least two defining elements; and means for making more than one change in any number of said defining elements in a same operation.

38. The system set forth in claim 37 wherein said storing means includes:

means for inhibiting said regenerating means until all of said defining elements associated with said derived elements have been modified.

39. A method for modifying derived elements derived from at least one defining element in a graphics system displaying each of said derived and defined elements as a plurality of pixels, said method comprises the steps of:

maintaining an internal reference between said derived elements and said at least one defining element; and editing at least one of said defining element in one operation without the regeneration of said derived elements until all of said at least one defining element has been modified.

40. A method for modifying derived elements derived from at least one defining element in a graphics system displaying each of said derived and at least one defined element as a plurality of pixels, said method comprises the steps of:

maintaining an internal reference between said derived elements and said at least one defining element; and making a plurality of changes in one or more of said defining elements.

41. A method for modifying derived elements derived from at least one defining element in a graphics system displaying each of said derived and defined elements as a plurality of pixels, said method comprises the steps of:

maintaining an internal reference between said derived elements and said defining element; and using said internal reference to identify and discard all derived elements associated with a modified defining element.

42. A method for modifying derived elements derived from at least one defining element in a graphics system displaying each of said derived and defined elements as a plurality of pixels, said method comprises the step of:

maintaining an internal reference between said derived elements and said defining element, wherein the derived elements are modified in accordance with established parameters and wherein said method further comprises the step of:

using said internal reference to rederive any derived elements without manually reestablishing any unchanged parameters.

43. The method as recited in claim 42 wherein said parameters control color derived from said defining elements.

44. The method as recited in claim 42 wherein said parameters control line widths derived from said defining elements.

45. The method as recited in claim 42 wherein said parameters control line attributes derived from said defining elements.

46. The method as recited in claim 42 wherein said parameters control fill attributes derived from said defining elements.

47. The method as recited in claim 42 wherein said parameters control a shape derived from said defining elements.

* * * * *